March 13, 1962     H. BURY     3,024,616

DEHUMIDIFIERS

Filed Oct. 6, 1959

INVENTOR
HARRY BURY

ATTORNEYS

United States Patent Office 3,024,616
Patented Mar. 13, 1962

3,024,616
DEHUMIDIFIERS
Harry Bury, Ickenham, England, assignor to The General Electric Company Limited, Kingsway, London, England
Filed Oct. 6, 1959, Ser. No. 844,786
Claims priority, application Great Britain Oct. 8, 1958
1 Claim. (Cl. 62—3)

This invention relates to dehumidifiers, and one object of the invention is to provide a dehumidifier which is compact and relatively silent in operation.

According to the present invention, a dehumidifier includes a thermoelectric device providing a pair of heat exchange surfaces adapted to be cooled and heated respectively by the Peltier effect, and means for directing air over said surfaces in such a manner that moisture is condensed from the air passing over the one heat exchange surface, the temperature of this air being subsequently raised by heat generated at the other heat exchange surface.

In one construction the heat exchange surfaces are spaced from one another in an air duct, the arrangement being such as to direct air over the surfaces in turn so that moisture is condensed from the air as it passes over the one heat exchange surface and the temperature of this air is raised as it passes over the other heat exchange surface.

In an alternative construction the heat exchange surfaces are mounted in separate air ducts providing parallel paths for the air flow, the arrangement being such as to direct air through the separate ducts in such a manner that moisture is condensed from the air passing through the one duct and the temperature of this air is raised as it mixes with the heated air issuing from the other duct on the discharge side of the humidifier. Any number of thermoplastic devices may of course be used and the number of air ducts would be dependent upon this number.

Figure 1:
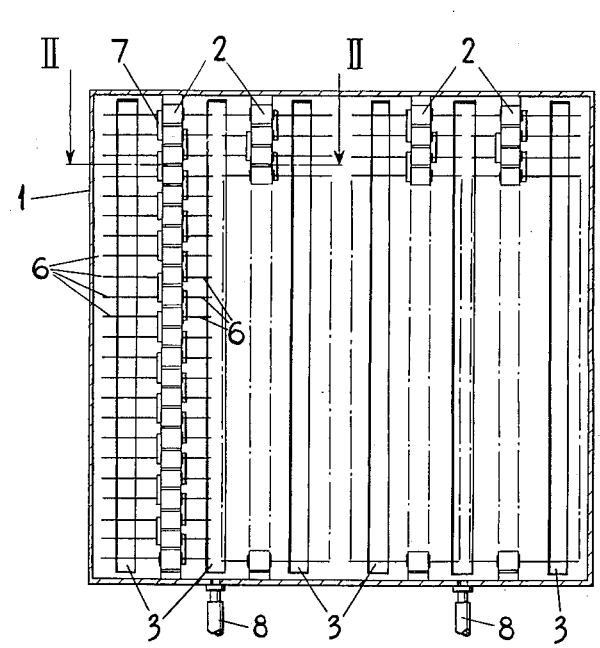
Figure 2:
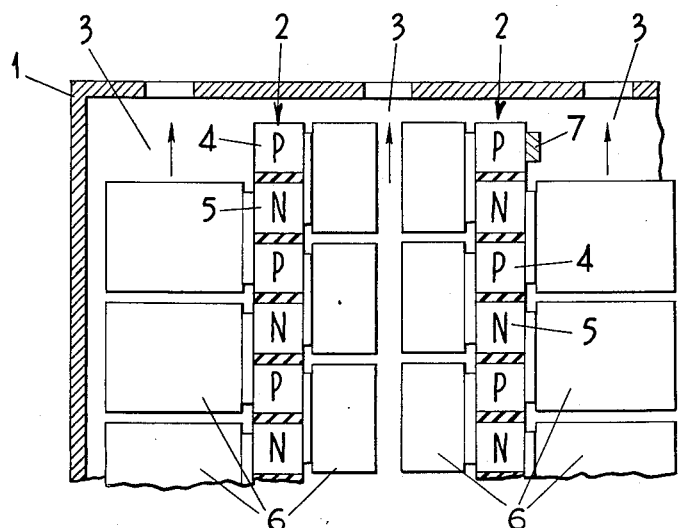

In order that the invention may be clearly understood, one example of a dehumidifier will now be described with reference to the accompanying drawing, in which FIGURE 1 is a sectional elevation of the device and FIGURE 2 is an enlarged fragmentary sectional view on line II—II in FIGURE 1.

Referring to the drawing, the dehumidifier comprises a tubular box 1 of rectangular cross section divided by four internal partitions 2 into five air ducts 3 extending from one end of the tubular box to the other. A fan (not shown) is provided at the inlet side of the dehumidifier which forces air through the ducts in five parallel streams which mix together on the discharge side.

Each of the internal partitions 2 is constituted by, or incorporates, a thermoelectric device comprising an assembly of thermojunctions, each thermojunction having a p-type semiconductor element 4 in association with an n-type semiconductor element 5, and the elements are electrically connected to provide hot and cold junctions on opposite sides of the assembly, the sides of the assembly thus becoming a "hot" side and a "cold" side respectively. Suitable semiconductors for this purpose are bismuth telluride and materials having a crystal structure similar to that of bismuth telluride, the semiconductors having the generic constitutional formula $X_2Y_3$, where X represents at least one of the elements bismuth, antimony and arsenic of group V of the periodic table and Y represents at least one of the elements tellurium, selenium and sulphur of group VI of the periodic table. The semiconductors of this group include both simple compounds such as bismuth telluride, antimony telluride and bismuth selenide, and substitutional solid solutions of two or more of such compounds.

A heat exchange surface is placed in close thermal contact with each side of each of the thermoelectric assemblies, these surfaces being formed by a plurality of metallic fins 6. The fins themselves provide the electrical connections between adjacent elements, the individual fins in this case being electrically insulated from each other. The rows of elements are themselves connected in series by end connecting straps 7 between the end elements of adjacent rows. The fins on the hot sides of the assemblies are of larger area than those on the cold sides. The thermoelectric devices are arranged so that each of the outer air ducts contains one set of fins, or heat exchange surface, on the "hot" side of an assembly, the ducts next to them each contain two "cold" heat exchange surfaces, and the centre duct contains two "hot" heat exchange surfaces. An advantage of this arrangement is that a greater volume of air can flow over the "hot" surfaces than over the "cold." in order to remove condensed moisture a drain 8 is provided in each of the cooling ducts.

In operation, air is forced through the dehumidifier in five parallel streams by the fan, the air in two of the streams being cooled to cause condensation of its moisture and its temperature being raised again on the discharge side of the dehumidifier as it mixes with the heated air of the other streams. In the cold air ducts, an appreciable lowering of the air temperature is required in order to cool the air below the dewpoint corresponding to the relative humidity required. In the hot air ducts it is desirable to keep the air temperature rise as low as possible so that the efficiency of the thermoelectric devices may be as high as possible.

In an alternative construction the fins are electrically insulated from the semiconductor elements by a bonded resin, the elements in this case being connected electrically in series by connecting straps between adjacent elements.

I claim.

A dehumidifier comprising a box structure, said structure providing a plurality of paths for the through-flow of air to be dehumidified and having inlet means and discharge means disposed respectively at opposite ends of said paths, partitions mounted within said box structure, said partitions being disposed parallel to one another and defining a plurality of ducts constituting said paths, thermocouple assemblies mounted in said partitions, each said assembly comprising alternately disposed p-type and n-type semiconductor elements connected to provide hot junctions and cold junctions, first heat exchange fins disposed in heat conducting relationship with the hot junctions of each said thermocouple assembly, second heat exchange fins disposed in heat exchange relationship with the cold junctions of each said thermocouple assembly, said first and second heat exchange fins lying in planes parallel to the direction of air flow through said ducts and being disposed respectively in alternate ducts, said first fins being of larger area than said second fins, and means for directing air through said ducts whereby moisture is condensed from the air passing through one set of alternate ducts and this air subsequently mixes with the air from another set of alternate ducts.

References Cited in the file of this patent
UNITED STATES PATENTS

| 2,779,172 | Lindenblad | Jan. 29, 1957 |
| 2,922,284 | Danielson | Jan. 26, 1960 |
| 2,944,404 | Fritts | July 12, 1960 |
| 2,949,014 | Belton | Aug. 16, 1960 |
| 2,970,450 | Roeder | Feb. 7, 1961 |

FOREIGN PATENTS

| 1,059,939 | Germany | June 25, 1959 |